United States Patent [19]

Meister

[11] Patent Number: 5,430,334
[45] Date of Patent: Jul. 4, 1995

[54] IMPACT SENSOR FOR VEHICLE SAFETY RESTRAINT SYSTEM

[75] Inventor: Jack B. Meister, Convent Station, N.J.

[73] Assignee: Echlin, Inc., Branford, Conn.

[21] Appl. No.: 950,315

[22] Filed: Sep. 24, 1992

Related U.S. Application Data

[63] Continuation-in-part of Ser. No. 615,074, Nov. 19, 1990, Pat. No. 5,177,370.

[51] Int. Cl.⁶ .................... H01H 35/14; B60R 21/32
[52] U.S. Cl. .................... 307/10.1; 73/517 R; 73/519
[58] Field of Search ............ 307/10.1, 121; 200/61.45 R, 61.45 M, 61.52, 61.53; 73/517 R, 518, 519, 520; 280/735; 340/438; 180/282

[56] References Cited

U.S. PATENT DOCUMENTS

| | | | |
|---|---|---|---|
| 4,103,842 | 8/1978 | Martin et al. | 200/61.52 |
| 4,281,245 | 7/1981 | Brogardh et al. | 250/227 |
| 4,484,041 | 11/1984 | Andres et al. | 200/61.45 M |
| 4,494,712 | 1/1985 | Godwin, Jr. et al. | 242/191 |
| 4,508,280 | 4/1985 | Hayush et al. | 242/191 |
| 4,609,059 | 9/1986 | Posterkamp | 177/50 |
| 4,639,563 | 1/1987 | Günther | 200/61.45 M |
| 4,743,780 | 5/1988 | Opie | 307/419 |
| 4,827,091 | 5/1989 | Behr | 200/61.45 M |
| 4,922,065 | 5/1990 | Behr et al. | 200/61.45 M |
| 4,933,515 | 6/1990 | Behr et al. | 200/61.45 M |
| 4,965,416 | 10/1990 | Bachmann | 200/61.45 M |
| 4,975,850 | 12/1990 | Diller | 307/10.1 |
| 4,980,526 | 12/1990 | Reneau | 200/61.45 M |
| 4,982,684 | 1/1991 | Rubey | 200/61.45 M |
| 5,072,181 | 12/1991 | Burger | 324/207.25 |
| 5,149,925 | 9/1992 | Behr | 200/61.45 M |
| 5,177,370 | 1/1993 | Meister | 307/10.1 |

FOREIGN PATENT DOCUMENTS

| | | | |
|---|---|---|---|
| 9014753 | 3/1991 | Germany | |
| 4224166 | 2/1993 | Germany | |
| WO8909146 | 10/1989 | WIPO | B60R 21/32 |

OTHER PUBLICATIONS

"Electronic Air-Bag Sensor For Futher Cars", Machine Design, vol. 64, No. 21, Oct. 22, 1992, p. 86.
Database WPI, Week 9232, Derwent Publications Ltd., London, GB.

Primary Examiner—Jeffrey A. Gaffin
Assistant Examiner—Peter Ganjoo
Attorney, Agent, or Firm—Barnes, Kisselle, Raisch, Choate, Whittemore & Hulbert

[57] ABSTRACT

A vehicle restraint system that includes an impact sensor coupled by fiber optics to an igniter for inflating an air bag. The impact sensor includes a permanent magnet disposed within a cavity and biased by magnetic force toward one end of the cavity, motion of the magnet in the cavity being sensed by a weigand wire or Hall sensor for igniting the air bag. Facility is disposed externally of the cavity for selectively adjusting the bias of the sensor and/or moving the magnet into proximity with the Hall effect or weigand wire sensor to test operative condition of the sensor.

24 Claims, 4 Drawing Sheets

IMPACT SENSOR FOR VEHICLE SAFETY RESTRAINT SYSTEM

This application is a continuation-in-part of application Ser. No. 07/615,074 filed Nov. 19, 1990 and now U.S. Pat. No. 5,177,370.

The present invention is directed to an acceleration sensor having particular utility as an impact sensor for activating safety restraints, such as an air bag, in an automotive vehicle. In this connection, the term "acceleration" as employed in this application specifically includes both positive and negative acceleration—e.g., severe deceleration caused by impact of a vehicle.

BACKGROUND AND OBJECTS OF THE INVENTION

A number of impact sensors have heretofore been proposed for activating vehicle restraint systems and other similar applications. For example, U.S. Pat. No. 4,329,549 discloses a sensor in which a spherical ball is biased toward one end of a cavity by a permanent magnet positioned externally of the cavity. Severe deceleration of a vehicle, on which the sensor is mounted and appropriately oriented, exerts sufficient force on the ball to overcome the force of attraction to the magnet, and to propel the ball longitudinally through the cavity against a pair of switch contacts. The switch contacts are connected to suitable devices for inflating an air bag or the like to prevent impact of a vehicle occupant against the steering wheel or dashboard.

A disadvantage of this design is that closely controlled tolerances are required between the ball and the surrounding cavity, which are difficult and expensive to control in manufacture. Furthermore, the ball must be sufficiently large to generate reliable contact force against the switch elements, necessitating use of a large magnet and consequently decreasing responsiveness of the sensor to impact forces. Weight of the ball may be reduced by plating the switch contacts with gold or the like, increasing the cost of manufacture. Dust particles and the like decrease reliability of the mechanical switch contacts. Additionally, the sensor disclosed in this patent is not well adapted to respond to impacts from all directions, necessitating use of more than one sensor in automotive applications.

U.S. Pat. No. 4,827,091 discloses an impact sensor in which a permanent magnet is longitudinally movable within a cavity of a non-magnetic body. The magnet is biased toward one end of the cavity by magnetic attraction to a ring positioned externally of the cavity. Electrical switch contacts are positioned at the opposing end of the cavity for abutting electrical and mechanical engagement with the magnet. U.S. Pat. No. 4,484,041 discloses an impact sensor in which a permanent magnet is movably mounted within a cavity of a non-magnetic body, and normally held by magnet attraction against a magnetically permeable element that closes one end of the cavity. Application of acceleration forces to the body sufficient to overcome the force of magnetic attraction propels the magnet against a spring at the opposing end of the cavity, which returns the magnet to its normal position when the acceleration forces are removed. A reed switch is positioned adjacent to the cavity to detect motion of the magnet against the spring.

U.S. Pat. No. 4,639,563 discloses a sensor in which a pair of magnets are movably mounted within the cavity of a non-magnetic body and oriented such that like poles on the magnets are opposed to each other and hold the magnets against opposing ends of the cavity. A reed switch is positioned adjacent to the cavity and generates an output signal when acceleration forces on either magnet are sufficient to overcome the force of magnetic repulsion and move the magnet toward the center of the cavity.

Although impact sensors of the type described have enjoyed limited acceptance in the art, further improvements remain desirable. For example, prior art impact sensors that involve closure of mechanical switch contacts, including reed switch contacts, are not manufactured with sufficient consistency to provide repeatable performance at a precise location of the switch-actuating member. The switch contacts can also be subject to corrosion and failure. Another problem in the art lies in failure to provide a mechanism for adjusting sensitivity of the sensor in operation. For example, the restraint system of an off-road vehicle should include facility for sensitivity adjustment to prevent activation of the restraint system as the vehicle is traveling over rough terrain. Systems heretofore proposed have also typically been characterized by an undesirable drain of battery power even when the vehicle is not in use.

A general object of the present invention is to provide an acceleration sensor that has particular utility as an impact sensor for activating a vehicle safety restraint system, that is compact and rugged in construction, that is reliable in operation, that activates quickly on application of vehicle impact forces, and/or that is inexpensive to manufacture. Another and more specific object of the present invention is to provide an impact sensor of the described character that embodies efficient, economical and reliable solid state technology. Yet another object of the present invention is to provide a vehicle restraint system that employs such a sensor.

Another and more specific object of the present invention is to provide an impact sensor that finds particular utility in an air-bag vehicle restraint system in which the sensor is coupled to the air-bag igniter by a fiber optic transmission that does not drain battery power during periods of non-use, that includes facility for selectively adjusting sensor sensitivity, that includes facility for testing operability of the sensor and restraint system, while inhibiting operation of the air bag itself, when the vehicle is initially turned on for example, and/or in which the sensor output is provided in the form of an analog signal of which rate of change indicates severity of sensor deceleration and may be analyzed for activating the air bag. Another object of the present invention is to provide an air-bag type vehicle restraint system that includes an impact sensor that satisfies one or more of the foregoing objectives.

SUMMARY OF THE INVENTION

An acceleration sensor that finds particular utility as an impact sensor in a vehicle restraint system comprises a permanent magnet movably mounted within a cavity in a non-magnetic body and facility for resiliently urging or biasing the magnet to one end of the cavity. An electronic sensor is disposed adjacent to the cavity for providing an electrical signal as a function of motion of the magnet within the cavity against the biasing force. In accordance with a first aspect of the present invention, sensitivity of the sensor may be selectively adjusted by varying the biasing force on the permanent magnet. For this purpose, an electromagnet is positioned adjacent to the cavity and is coupled to electronic circuitry for selectively varying force of attraction/repulsion of the electromagnet on the magnet within the cavity. Operative condition of the sensor may also be tested by applying a signal to the electromagnet for urging the permanent magnet within the cavity into proximity with the electrical sensor. In an alternative embodiment, the magnet is coupled to a linear actuator, which may be energized to move the magnet mechanically into proximity with the sensor.

In accordance with a second aspect of the present invention, which may be employed separately from or in combination with the first aspect of the invention, the electrical sensor comprises a hall effect sensor that provides an analog output signal that varies as a continuous and substantially monotonic function of position of the magnet within the cavity. Rate of change of the sensor output signal is analyzed, and the air bag is inflated when rate of change of the sensor output signal indicates an impact of severity that calls for air bag inflation.

In accordance with a third aspect of the present invention, which again may be used either separately from or in combination with one or more other aspects of the invention, the impact sensor is coupled to air bag inflation electronics by a fiber optic cable. The sensor is contained within an enclosure that includes a light emitter with a portion that projects from the enclosure for coupling to one end of the fiber optic cable. The opposing end of the cable is connected to a light sensor, which in turn is connected to the inflation electronics. The fiber optic cable draws no power when not in use, and therefore conserves vehicle battery energy.

In accordance with yet another aspect of the present invention, which again may be used either separately from or in combination with one or more other aspects of the invention. The electronic sensor comprises a weigand wire that is characterized by first and second stable magnetic flux-generating states responsive to proximity of magnetic fields of differing polarity for switching between such states. A suitable pick-up, such as an electrical coil, is positioned adjacent to the weigand wire, preferably encircling the same, for detecting a change in the flux-generating state of the weigand wire responsive to proximity of the sensor magnet thereto, and thereby generating a sensor output signal. In accordance with a particular feature of this aspect of the invention, the magnet, cavity and weigand wire sensor are constructed and arranged such that motion of the magnet from the first position to the second position within the cavity switches the weigand wire from the first state back to the second state, and motion of the same magnet from the second position back to the first position switches the weigand wire sensor from the second state to the first state. The weigand wire sensor is thus automatically reset preparatory to a next acceleration sensing cycle. This automatic reset feature is accomplished by polarizing the magnet longitudinally of the cavity, and positioning the weigand wire sensor between the first and second positions of the magnet within the cavity, such that motion of the magnet from the first position to the second position, and from the second position to the first position, subjects the weigand wire sensor to varying magnetic fields of opposite polarity.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosure of parent application Ser. No. 07/615,074 filed Nov. 19, 1990 is incorporated herein by reference.

Figure 1:
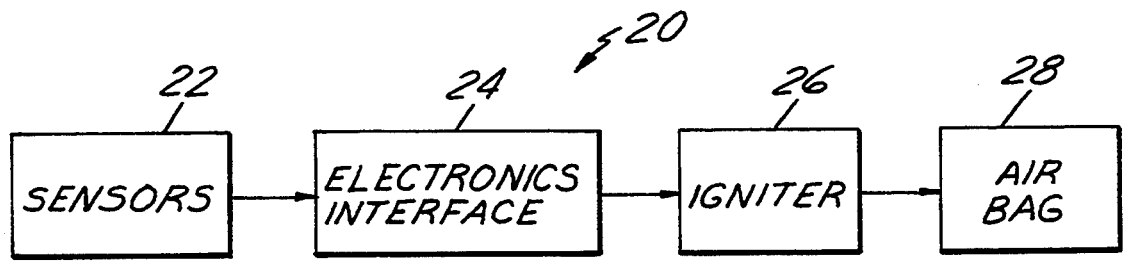
FIG. 1 is a functional block diagram of a vehicle safety restraint system in accordance with one presently preferred implementation of the invention.

FIG. 1 illustrates a vehicle restraint system 20 in which one or more impact sensors 22 provide output signals to an electronic interface 24 indicative of rapid deceleration of the vehicle caused by impact from one or more directions. Interface 24 provides a corresponding signal to an igniter 26, which in turn initiates a chemical reaction for rapidly inflating a vehicle restraint air bag 28.

Figure 2:
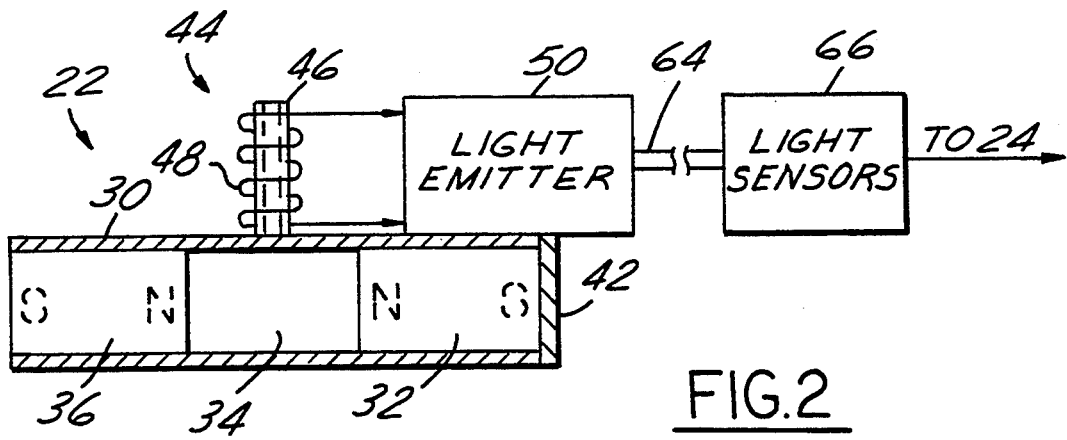
FIG. 2 is a schematic diagram in side elevation of an impact sensor in accordance with one presently preferred embodiment of the invention with fiber optic interconnection to the restraint mechanism.
Figure 3:
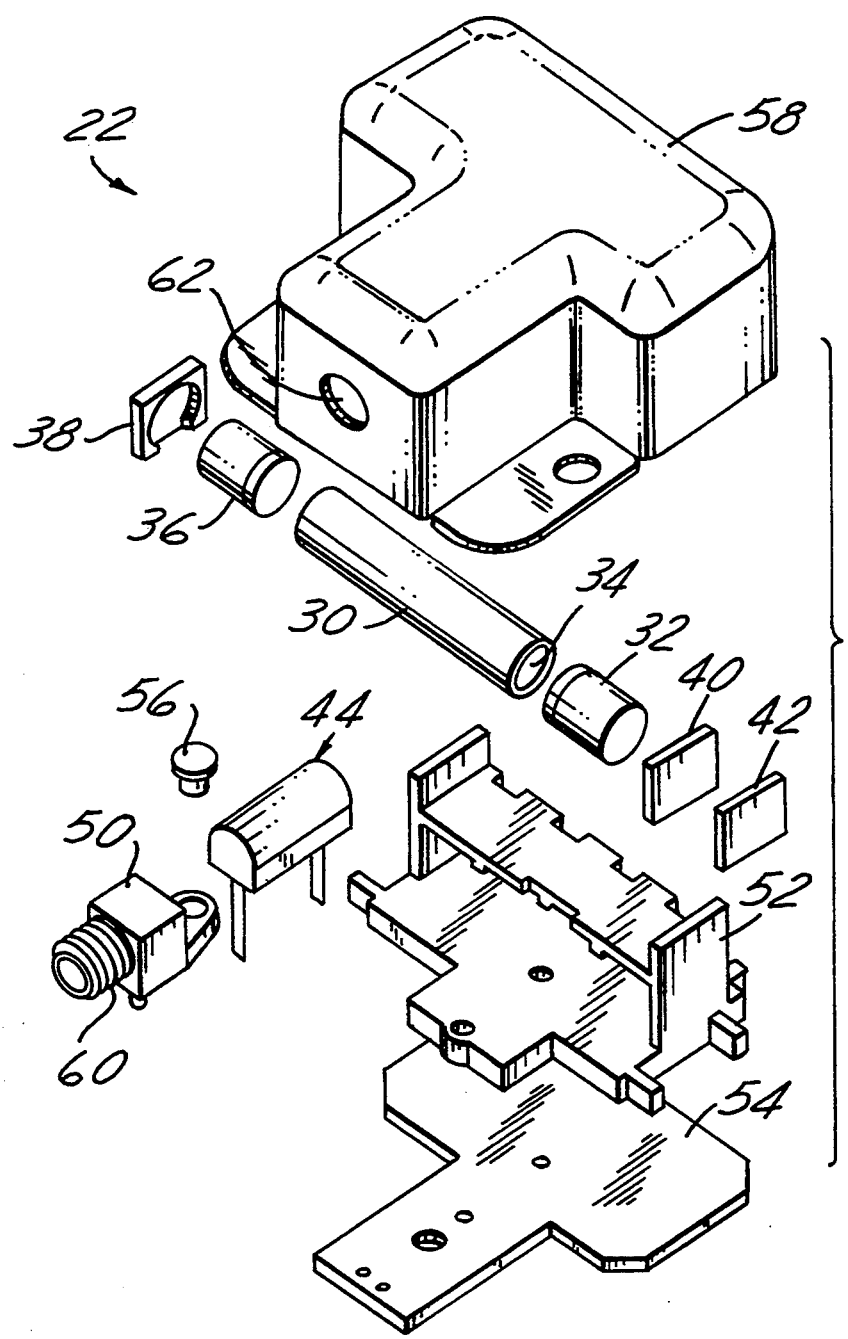
FIG. 3 is an exploded perspective view of the impact sensor illustrated schematically in FIG. 2.

FIGS. 2 and 3 illustrate a sensor 22 in accordance with a presently preferred embodiment of the invention as comprising a tubular body 30 of non-magnetic construction. A first permanent magnet 32 is slidably disposed within a cylindrical cavity 34 in body 30, and a second magnet 36 is fixedly positioned at the opposing end of cavity 34. Magnets 32,36 have identical magnetic poles, the "north" poles in FIG. 2, opposed to each other. Cavity 34 is sealed by a pair of end caps 38,40 (FIG. 3), and a plate 42 of magnetic material is disposed adjacent to end cap 40 externally of cavity 34. Thus, magnet 32 is resiliently urged to one end of cavity 34 by magnetic repulsion from magnet 36 and magnetic attraction to plate 42.

A weigand wire sensor 44 is disposed externally adjacent to cavity 34 for sensing motion of magnet 32 against the biasing forces of magnet 36 and plate 42. Sensor 44 includes a central weigand wire core 46, and a coil 48 that surrounds the core and is responsive to the magnet fields therein. Sensor coil 48 is connected to a light emitter 50, such as a photo or laser diode. Tubular body 30 with magnets 32,36 captured therewithin, end caps 38,40 and biasing plate 42 are mounted on a support bracket 52 that is carried by a circuitboard 54. weigand wire sensor 44 is also mounted on bracket 52, and light emitter 50 is fastened to board 54 by a rivet 56. The entire assembly is enclosed by an internally shielded molded plastic or steel cover 58, which is fastened to circuitboard 54. The threaded end 60 of emitter 50 projects through an opening 62 in case 58 for connection to a conventional fiber optic coupling.

Returning to FIG. 2, light emitter 50 is connected by an optical fiber 64 to a light sensor 66, which in turn is connected to electronic interface circuitry 24 (FIG. 1). Thus, sensor 22 (FIGS. 2 and 3) may be positioned at any suitable location on a vehicle, while interface 24 and air bag ignition circuitry 26 may be positioned either beneath the vehicle dashboard or beneath the vehicle hood and connected to the sensor by an appropriate length of optical fiber 64. The fiber optic transmission line does not absorb electrical energy during periods of non-use, and thus conserves vehicle battery power. Construction and operation of weigand wire sensor 44 are discussed in greater detail in parent application Ser. No. 07/615,074, and reference is made to that application for more detailed discussion.

Figure 4A:
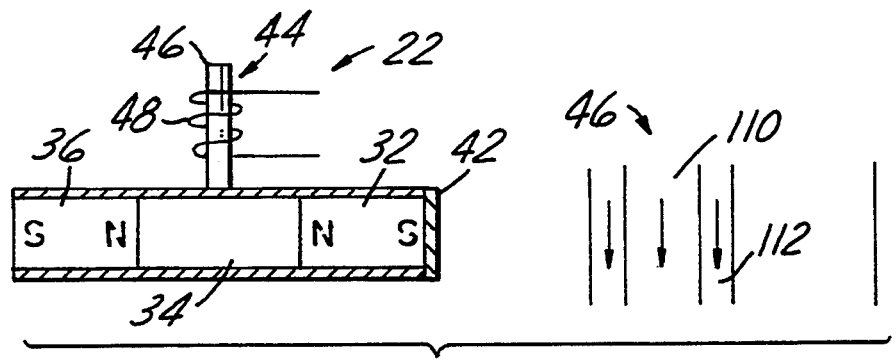
FIGS. 4A–4D are schematic diagrams that illustrate successive stages in operation of the sensor illustrated in FIGS. 1–3, together with associated sensor states and output signals.
Figure 4B:
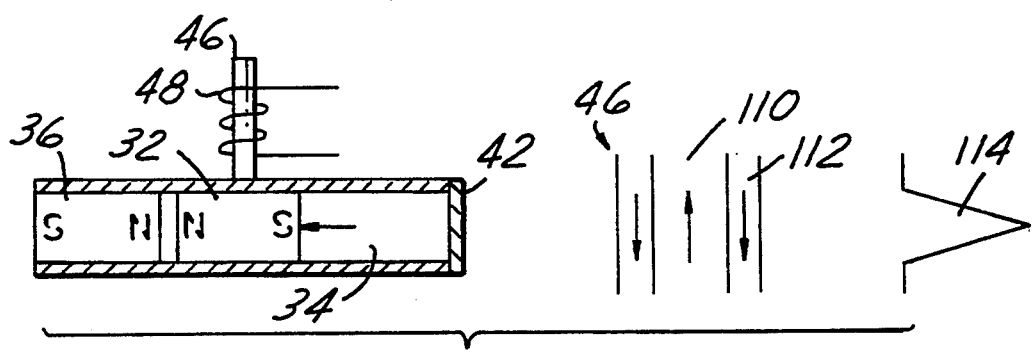
Figure 4C:
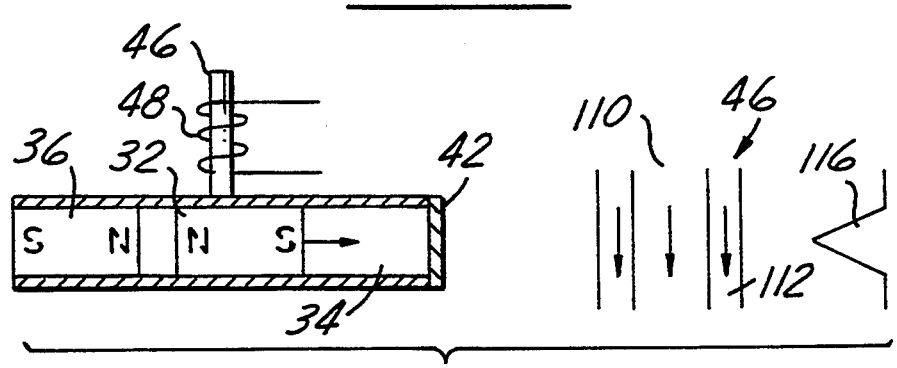
Figure 4D:
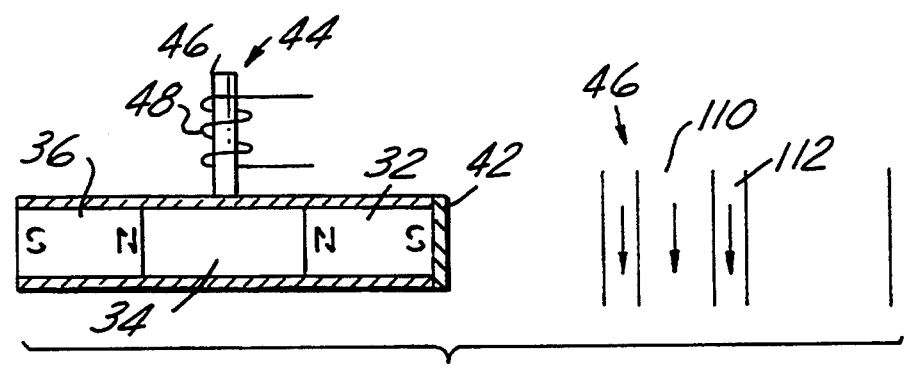

FIGS. 4A-4D illustrate operation of sensor 22, with particular emphasis on the automatic reset feature of the sensor hereinabove summarized. Weigand wire section 46 has a central core wire 110 surrounded by a shell 112. Initially, as shown in FIG. 4A, the magnetic fields in core 110 and shell 112 are in the same direction, so that the core and shell combined to generate a strong external magnetic field. When wire 46 is subjected to a change in magnetic field caused by motion of magnetic 32 from its first or rest position illustrated in FIG. 4A to its second or sensing position illustrated in FIG. 4B, such changing magnetic field reverses the magnetic field in core 110. This field reversal essentially collapses the magnetic field surrounding wire 46, generating a corresponding signal 114 in coil 48. When the acceleration forces are removed, and magnet 32 is returned to its first or rest position by the combined magnetic forces applied thereto by plate 42 and magnet 36, wire 46 is subjected to a changing magnetic field of opposite polarity, resetting the wire core 110 to its original magnetic polarity as shown in FIG. 4C. The magnetic fields of core 110 and shell 112 thus again reinforce each other to generate a strong external magnetic field, with the change again being sensed by coil 48 to generate a signal 116 of polarity opposite to that of signal 114 (FIG. 4B). Return motion of magnet 32 to its rest position thus resets sensor 22 to its original state (FIGS. 4A and 4D) preparatory to application of the next acceleration force cycle to be sensed by the sensor.

Figure 5:
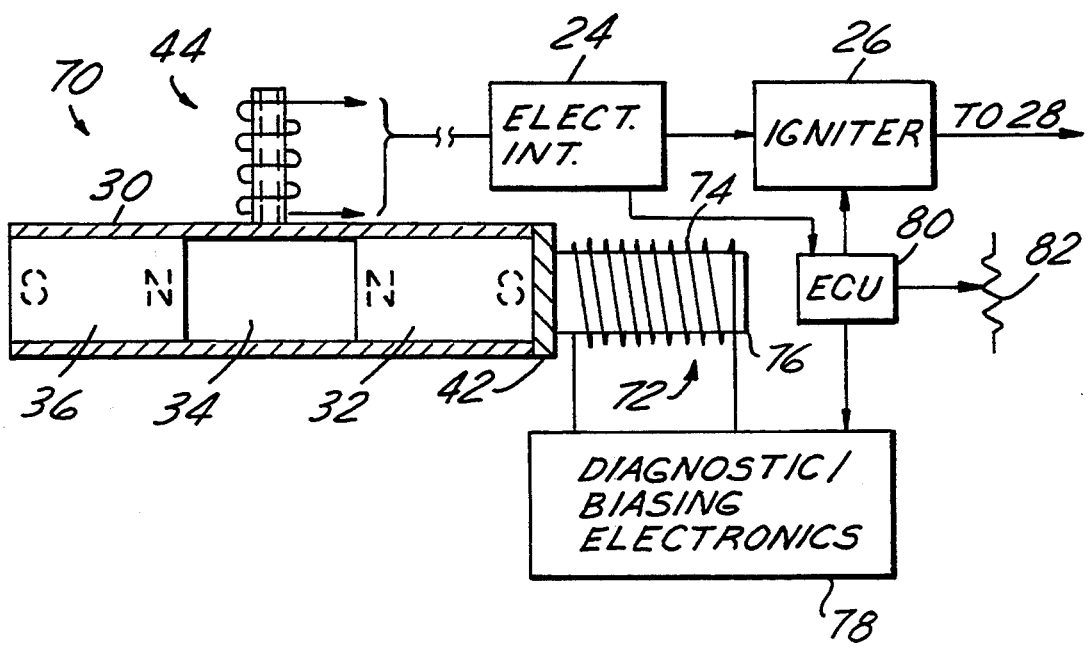
FIGS. 5–7 are schematic diagrams in side elevation that illustrate respective modified embodiments of the invention.

FIG. 5 illustrates a modified vehicle restraint system 70 in which an electromagnet 72 is disposed adjacent to magnet 32 externally of cavity 34 and plate 42. Magnet 72 comprises a coil 74 that surrounds a core 76 of ferromagnetic material, which is externally axially aligned with cavity 34 and magnet 32. Coil 74 is connected to electronics 78 for adjustably varying the current applied to electromagnet 72 for either adjusting the magnetic bias applied to magnet 32 and thereby adjusting sensitivity of sensor 70, or for testing operative condition of the sensor. More specifically, electronics 78 receives control signals from the vehicle computer or ECU 80. Computer 80 also receives a signal from interface electronics 24, and inhibits the final stage of operation of igniter 26 during a diagnostic operation. When the vehicle ignition is first turned on, ECU 80 automatically controls electronics 78 to apply a signal to electromagnet 72 of sufficient magnitude to overcome the biasing forces on magnet 32, and to propel the magnet into proximity with sensor 44. Sensor 44 thereby supplies a sensor signal to computer 80 through interface 24. In the meantime, computer 80 inhibits inflation of the air bag. In this way, operative condition of sensor 70 is tested each time the vehicle is operated.

Electronics 78 may also be employed to control sensitivity of sensor 70. For example, computer 80 may be responsive to an operator adjustment 82 for controlling electronics 78 to apply a current to magnet 72 to assist magnet 38 and plate 42 in biasing magnet 32 away from sensor 44 where decreased sensor sensitivity is desired, such as when the vehicle is to be operated over rough terrain. When the vehicle is thereafter to be operated on a normal road surface, the operator may provide input to computer 80 for reducing or terminating such biasing current to electromagnet 72, and to return sensor 70 to normal sensitivity.

Figure 6:
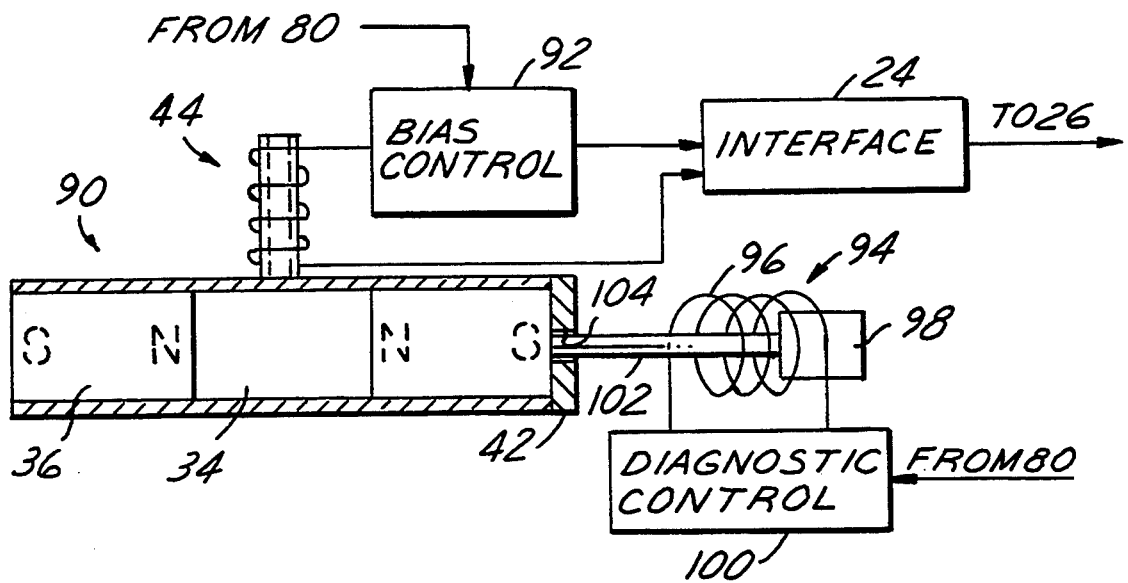

FIG. 6 illustrates a modified embodiment 90 in which the bias and diagnostic functions are separated, rather than combined as in FIG. 5. Specifically, bias control electronics 92 are connected between sensor 44 and interface 24. Electronics 92 are responsive to a control signal from ECU 80 (FIG. 5) for adjustably varying current applied to sensor 44, and thereby adjusting rate of change of magnetic field to which sensor 44 is responsive. An electromagnetic linear actuator 94 has a coil 96 and an armature 98. Coil 96 is connected to diagnostic control electronics 100, which receive a signal from ECU 80 (FIG. 4) to control application of current to coil 96. Armature 98 has an axially extending non-magnetic finger 102 that projects through an aperture 104 in plate 42 to engage magnet 32. When current is applied to coil 96 of actuator 94, armature 98 and finger 102 push magnet 32 into proximity with sensor 44. Operability of sensor 90 may thus be selectively diagnosed. Magnetic forces or magnet 32, applied by magnet 36 and plate 42, are sufficient to return armature 98 to the rest position shown in FIG. 6 where current is no longer applied to coil 96.

Figure 7:
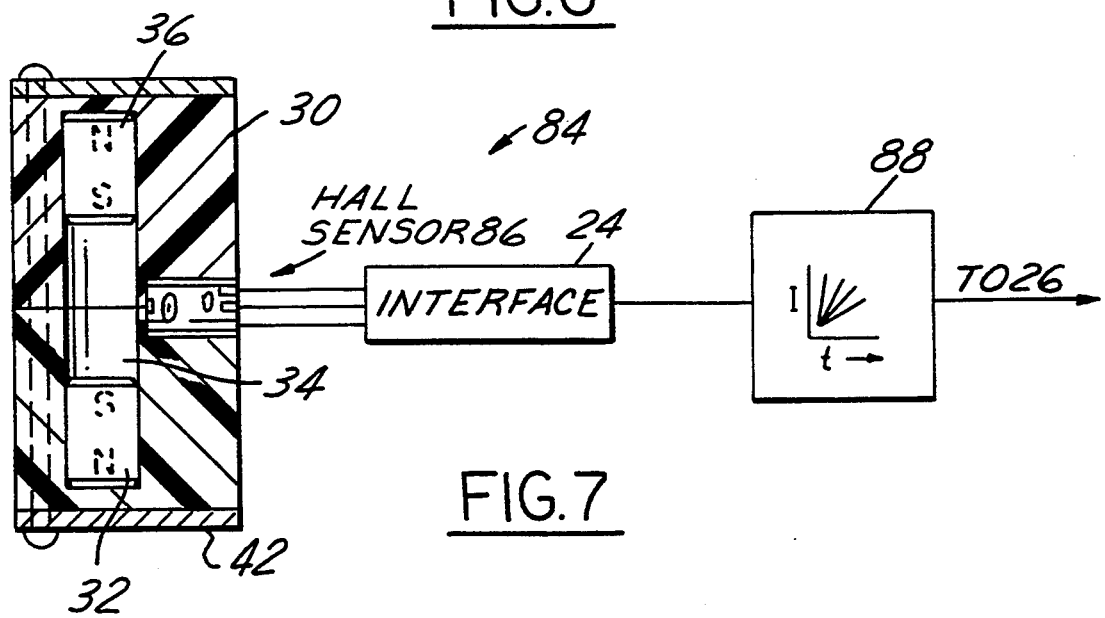

FIG. 7 illustrates a modified impact sensor 84 in which weigand wire sensor 44 of FIGS. 2-5 is replaced by a Hall effect sensor 86. Hall effect sensor 86 differs from weigand wire sensor 44, and from reed switch and mechanical switch sensors typical of the prior art, in that Hall effect sensor 86 provides an analog output signal in which the output voltage or current varies as a substantially continuous monotonic function of position of magnet 32 within cavity 34. This analog sensor output signal is supplied through interface 24 to a computer 88, which analyzes the rate of change or slope of the sensor output signal as a function of time. Computer 88 provides an impact signal to air bag igniter 26 to activate the air bag restraint only when the slope of the sensor output signal indicates a vehicle impact of sufficient severity to call for inflation of the air bag restraint.

I claim:
1. A vehicle restraint system that comprises:
 restraint means for positioning in a vehicle to restrain motion of an occupant upon operation of said restraint means,
 an impact sensor including means for sensing vehicle impact to provide an impact signal, said impact sensor including means of non-magnetic construction having an internal cavity, a permanent magnet movably mounted within said cavity, means for resiliently urging said magnet to a first position within said cavity, and a Hall sensor positioned adjacent to said cavity for sensing motion of said magnet against force of said urging means to generate said impact signal as an electrical signal having a magnitude that varies as a continuous monotonic analog function of position of said magnet within said cavity, means responsive to said impact signal for operation said restraint means, including means for analyzing rate of change of said analog electrical signal and operating said restraint means when said rate of change indicates a vehicle impact condition, and means for selectively adjusting sensitivity of said impact sensor by adjustably varying force urging said magnet to said first position, said selectively adjusting means comprising an electromagnet positioned axially externally adjacent to said cavity and means for selectively varying force of attraction/-repulsion of said electromagnet on said magnet.

2. The system set forth in claim 1 further comprising means coupled to said electromagnet for selectively testing operative condition of said impact sensor by magnetically urging said magnet into proximity with said magnetic sensing means.

3. The system set forth in claim 2 further comprising means for disabling operation of said means for operating said restraint means during testing of said impact sensor.

4. The system set forth in claim 3 wherein said sensor includes means for supplying said impact signal as an electrical signal, and wherein said system further includes a light emitter at said sensor responsive to said electrical signal to provide a light signal, a light sensor at said signal-responsive means for reconverting said light signal into an electrical signal, and a fiber optic connecting said light emitter to said light sensor.

5. The system set forth in claim 4 wherein said impact sensor further includes means enclosing said impact sensor and said light emitter in a housing, said light emitter including means projecting from said housing for coupling to said fiber optic.

6. The system set forth in claim 1 further comprising means operatively coupled to said electromagnet for selectively testing operative condition of said impact sensor by urging said magnet into proximity with said magnetic sensing means.

7. An acceleration sensor that comprises:
a body of non-magnetic construction have an internal cavity,
a first permanent magnet mounted within said cavity for movement therewithin between at least first and second positions spaced from each other longitudinally of said cavity,
means for resiliently urging said magnet to said first position within said cavity,
bistable magnetic flux-generating means carried by said body externally of said cavity, said flux generating means having first and second stable states of magnetic flux generated by said flux-generating means, and being responsive to proximity of a magnetic field of one polarity for switching from said first state to said second state, and to proximity of a magnetic field of polarity opposite to said one polarity for switching from said second state back to said first state, and
means positioned adjacent to said flux-generating means, and responsive to switching of said magnetic flux-generating means from said first state to said second state as a result of motion of said magnet from said first position to said second position to generate a sensor output signal,
said magnet, said cavity and said signal-generating means being constructed and arranged such that motion of said magnet from said first position to said second position switches said flux-generating means from said first state to said second state to generate said signal, and to motion of the same said magnet from said second position back to said first position under force of said resiliently urging means to switch said flux-generating means from said second state back to said first state.

8. The sensor set forth in claim 7 wherein said bistable magnetic flux-generating means comprises a length of weigand wire carried by said body on an axis parallel to said cavity.

9. The sensor set forth in claim 8 wherein said signal-generating means comprises an electrical coil positioned adjacent to said weigand wire.

10. The sensor set forth in claim 9 wherein said coil encircles said weigand wire.

11. The sensor set forth in claim 22 wherein said magnet-urging means comprises magnetically permeable means positioned externally of said cavity adjacent to said first position, such that acceleration force on said magnet must overcome force of attraction between said magnet and said magnetically permeable means to move said magnet to said second position.

12. The sensor set forth in claim 7 wherein said magnet-urging means comprises a second permanent magnet mounted within said cavity at a position opposed to said first position said first magnet, said first and second magnet having opposed like magnetic poles such that said first magnet is urged to said first position by magnetic repulsion from said second magnet.

13. The sensor set forth in claim 12 wherein said magnet-urging means further comprises magnetically permeable means positioned externally of said cavity adjacent to said first position.

14. The sensor set forth in claim 7 wherein said magnet is polarized lengthwise of said cavity, said flux-generating means being disposed externally of said cavity between said first and second positions of said magnet such that motion of said magnet from said first position to said second position and from said second position to said first position subjects said flux-generating means to varying magnetic fields of opposite polarity.

15. A vehicle restraint system that comprises:
restraint means for positioning in a vehicle to restrain motion of an occupant upon operation of said restraint means,
an impact sensor including means for sensing vehicle impact to provide an impact signal, said impact sensor including means of non-magnetic construction having an internal cavity, a permanent magnet movably mounted within said cavity, means for resiliently urging said magnet to a first position within said cavity, and a Hall sensor positioned adjacent to said cavity for sensing motion of said magnet against force of said urging means to generate said impact signal as an electrical signal having a magnitude that varies as a continuous monotonic analog function of position of said magnet within said cavity,
means responsive to said impact signal for operating said restraint means, including means for analyzing rate of change of said analog electrical signal and operating said restraint means when said rate of change indicates a vehicle impact condition, and
means operatively coupled to said magnet for selectively testing operative condition of said impact sensor by urging said magnet into proximity with said magnetic sensing means so as to generate said electrical analog signal independent of a vehicle impact condition.

16. The system set forth in claim 15 wherein said condition-testing means comprises an electromagnet disposed axially externally adjacent to said cavity.

17. The system set forth in claim 15 further comprising means coupled to said electromagnet for selectively adjusting sensitivity of said impact sensor by adjustably varying force of attraction/repulsion of said electromagnet urging said magnet to said first position.

18. The system set forth in claim 15 wherein said condition-testing means comprises an electromagnetic actuator disposed externally of said cavity and operatively coupled to said magnet.

19. A vehicle restraint system that comprises:
an impact sensor including means for sensing vehicle impact to provide an impact signal,
restraint means for positioning in a vehicle to restrain motion of an occupant upon operation of said restraint means,
means responsive to said impact signal for operating said restraint means,
fiber optic means interconnecting said sensor and said signal-responsive means for supplying said impact signal to said signal-responsive means,
said impact sensor including means of non-magnetic construction having an internal cavity, a permanent magnet movably mounted within said cavity, means for resiliently urging said magnet to a first position within said cavity, and magnetic sensing means positioned adjacent to said cavity for sensing motion of said magnet against force of said urging means to generate said impact signal as an electrical signal,
said magnetic sensing means comprising a Hall sensor for providing said electrical signal having a magnitude that varies as a continuous monotonic analog function of position of said magnet within said cavity, said means responsive to said impact signal including means for analyzing rate of change of said analog signal and operating said restraint means when said rate of change indicates a vehicle impact condition,
said fiber optic means including a light emitter at said sensor responsive to said electrical signal to provide a light signal, a light sensor at said signal-responsive means for reconverting said light signal into an electrical signal, and a fiber optic connecting said light emitter to said light sensor, and
means for selectively adjusting sensitivity of said impact sensor by adjustably varying force urging said magnet to said first position, said selectively adjusting means comprising an electromagnet positioned axially externally adjacent to said cavity and means for selectively varying force of attraction/repulsion of said electromagnet on said magnet.

20. The system set forth in claim 19 further comprising means coupled to said electromagnet for selectively testing operative condition of said impact sensor by magnetically urging said magnet into proximity with said magnetic sensing means.

21. The system set forth in claim 20 further comprising means for disabling operation of said means for operating said restraint means during testing of said impact sensor.

22. A vehicle restrain system that comprises:
an impact sensor including means for sensing vehicle impact to provide an impact signal,
restraint means for positioning in a vehicle to restrain motion of an occupant upon operation of said restraint means,
means responsive to said impact signal for operating said restraint means,
fiber optic means interconnecting said sensor and said signal-responsive means for supplying said impact signal to said signal-responsive means,
said impact sensor including means of non-magnetic construction having an internal cavity, a permanent magnet movably mounted within said cavity, means for resiliently urging said magnet to a first position within said cavity, and magnetic sensing means positioned adjacent to said cavity for sensing motion of said magnet against force of said urging means to generate said impact signal as an electrical signal,
said magnetic sensing means comprising a Hall sensor for providing said electrical signal having a magnitude that varies as a continuous monotonic analog function of position of said magnet within said cavity, said means responsive to said impact signal including means for analyzing rate of change of said analog signal and operating said restraint means when said rate of change indicates a vehicle impact condition,
said fiber optic means including a light emitter at said sensor responsive to said electrical signal to provide a light signal, a light sensor at said signal-responsive means for reconverting said light signal into an electrical signal, and a fiber optic connecting said light emitter to said light sensor, and
means operatively coupled to said magnet for selectively testing operative condition of said impact sensor by urging said magnet into proximity with said magnetic sensing means.

23. The system set forth in claim 22 wherein said condition-testing means comprises an electromagnet disposed axially externally adjacent to said cavity.

24. The system set forth in claim 22 wherein said condition-testing means comprises an electromagnetic actuator disposed externally of said cavity and operatively coupled to said magnet.

* * * * *

UNITED STATES PATENT AND TRADEMARK OFFICE
CERTIFICATE OF CORRECTION

PATENT NO. : 5,430,334
DATED : July 4, 1995
INVENTOR(S) : Jack B. Meister

It is certified that error appears in the above-indentified patent and that said Letters Patent is hereby corrected as shown below:

Claim 11, column 8, line 16, replace "22" with --7--.

Claim 12, column 8, line 26, after "position" and before "said" insert --of--.

Claim 17, column 9, line 6, replace "15" with --16--.

Signed and Sealed this

Nineteenth Day of March, 1996

*Attest:*

BRUCE LEHMAN

*Attesting Officer*     *Commissioner of Patents and Trademarks*